UNITED STATES PATENT OFFICE.

LINBOMIR R. MESTANIZ, OF BROOKLYN, NEW YORK.

MAKING ARTIFICIAL BONE, EBONY, MARBLE, &c.

SPECIFICATION forming part of Letters Patent No. 353,697, dated December 7, 1886.

Application filed November 17, 1883. Renewed January 2, 1886. Serial No. 187,424. (Specimens.)

*To all whom it may concern:*

Be it known that I, LINBOMIR R. MESTANIZ, a citizen of the United States, residing at Brooklyn, Kings county, and State of New York, have invented certain new and useful improvements in the making of artificial bone, ebony, marble, and other substances, for various purposes and devices, as articles of wear, ornaments for personal and household use, and also in the arts and applied sciences; and I do hereby declare that the following is a full, clear, and exact description of the invention, which will enable others skilled in the art to which it appertains to make and use the same.

Heretofore and for a long period in parts of the continent of Europe and in this country the domestic or common pot-cheese has been treated with chemical agents, principally sal-soda and acetic acid, for the purpose of extracting from the caseine an adhesive matter, which serves as a glue, and with the property of being insoluble in water. Mixed with plaster or lime it acts as cement in the mending of statuary, or for the making of a durable article for other uses. If colored, it will produce imitation agate, coral, &c. Frequently, however, it happens that the materials first combined to effect a glutinous mass are spoiled and rendered worthless, for the reason that sal-soda, if used in sufficient quantity to remove the butyraceous and other substances to be removed from the cheese solution, renders the resulting mass too brittle for available use. Other failures are caused in the use of the acid, owing to its variable strength, either in too small or large a quantity, and so by inexpert handling losing or overstepping the exact period of agglutination. Besides, the process is expensive because of the waste afore indicated, but principally in the high cost of the material employed.

The object of my invention is in the main fourfold: first, the promotion of greater economy in manufacture, avoiding loss occasioned by the modes of manipulation, some of which are stated above; second, the indication of a method insuring successful results; third, the use of materials whose prime cost is low; and, fourth, the obtaining of products of different degrees of hardness and colors even to the purest white, and thus of the widest range of adaptation for largely variant ends.

Having stated such object in general terms, I now proceed to give in detail the successive processes by which it is attained.

First. I take ordinary skimmed milk, and to free this from every trace of oleaginous matter I mix it with about one-third its volume of water, and then cast in sufficient salt (chloride of sodium) to cover the bottom of the vessel containing the mixed milk and water for about or less than one-sixteenth of an inch; or the salt may be first sprinkled over the bottom of the vessel and the milk and water introduced by siphon or other contrivance, so as to disturb the layer of salt as little as possible. I then lower the temperature of the mixture below 60° Fahrenheit. The butyraceous and other like ingredients will soon rise to the surface, to be then removed by skimming or decanting. Thereafter the residue is to be slowly passed through one or more strainers made of cotton or flannel; but the salt used should not exceed three (3) pounds to every four hundred gallons of milk and water.

Second. The temperature of the strained fluid is then to be raised. If the ultimate end of the process is a very hard material, as of an imitation porcelain figure, the heat requisite is to be not less than 160° Fahrenheit; but where a greater ductility will suffice it need not be above 135° Fahrenheit. When the proper degree of heat has been attained, dissolve in warm water caustic soda, using for every four hundred gallons of the fluid one-half of a pound. Strain this to free it from impurities, if the commercial sort is used, and then add it to the fluid. This must then be stirred (the motion being in one direction, ceasing near the center) for about ten minutes. The cooling process down to 100° Fahrenheit must then be instituted, slowly if the resultant is to be pliable, and more rapidly if to be firm and resistent. If the material is likely when in use to come into contact with water, add to the fluid so brought to 100° Fahrenheit one-half of one ounce of commercial silicate of sodium previously mixed with water to give it due fluidity and duly incorporate by gentle stirring.

Third. When it is not needed that the ultimate material should be of absolute or delicate shades of white, I then add five pounds of terra-alba, where medium shades of color— such as red, purple, or violet—are required, less for darker, and only two pounds for an absolute black, and afterward the coloring and one-quarter of an ounce of glycerine. Stir as before, and heat up to 102° Fahrenheit for the softer, and to 105° Fahrenheit for the harder, material. If more delicate shades, as of pink, rose, &c., are sought, I add with the terra-alba ten pounds of artificial or chemically-prepared sulphate of baryta in pulp form; or if additional weight is no objection a like amount of plumbum sulphuricum, also in like form. If an ivory color is desired, then double at least the quantity of the last-named ingredients, and add one, two, or more drops of yellow aniline dissolved in alcohol, according to the exact shade wanted. When imitations of porcelain, marble, and the like are to be produced, I further add seventy-five pounds of the finest white ground silica. Then the entire mass settling on the bottom of the vessel is to be scooped up by the hands or other process, so that the admixture may be even throughout.

Fourth. I then mix hydrochloric acid, commercially known as "18° Baumé," and nitric acid, likewise known as "42° Baumé," these being preferable, in my experience, to other grades of these acids, and only as so preferred designated of such grade. The proportions of these acids vary, according to the requisite hardness of the material and its color, from nine parts of the first to one part of the second. Of the combined acids and in the proportion needed, as is above indicated, I take about ten pounds, and for each pound of salt as used above under the first head of this description I add to the above mixture about one-half ounce of sulphuric acid, and dissolve the whole in about twenty times its weight of water. This solution is to be distributed by pouring or sprinkling over the surface of the fluid, the scooping up process being continued. When the fluid becomes absolutely clear, the supply of the acid solution is discontinued. If it is seen that too much of it has been used, a small quantity of a solution of caustic soda or aqua-ammonia will correct the mistake. When the fluid is transparent, although of a green or another tint, it is then drawn off, and the remaining mass, the principal result of this process, is left to be thereafter pressed and seasoned.

Fifth. Where very delicate hues are required, a bleaching process of the milk is to be instituted after thus treated with caustic soda and while its temperature is below 100° Fahrenheit. To this end hydrochloric acid gas or chlorine evolved separately may be introduced near the bottom of the vessel, or sulphurous-acid gas, or any of the ordinary bleaching-powders acting as not reagents on the chemicals in the solution diluted largely with water may be used. When this milk and caustic-soda solution assumes a whitish shade, add the requisite coloring-matter and other ingredients, as above set forth. If while the gas or other bleaching solution introduced is working the material commences to curl or precipitate, this may not be regarded as endangering the result, but may be allowed to continue until the fluid is clearing to a light-tinted color, thereafter to be drawn off, and the residual mass is to be treated as if precipitated under the previous formula, and after thorough washing mix with the coloring and earthy ingredients in accordance with the foregoing directions, except that no silicate of sodium is to be used. If it is desired to bleach the material after it has been precipitated, and before any of the earthy ingredients except silica have been added, place the mass in a vessel filled with water and treat with the acid gases from twelve to fifteen hours, and until the water gets a purplish or other light tint, or bathe it with either of the bleaching solutions above named, or of sulphuric acid and salt. Let it rest for a couple of hours, draw off the fluid, wash the mass, and while drying incorporate thoroughly the earthy ingredients. If it is desired to bleach the material before its precipitation and after the incorporation of the earthy ingredients or of the colors, or to get a bleached bone color, the solution is to be mixed with four (4) pints of commercial aqua-ammonia to each four hundred gallons of milk and water. Thereafter chloride of barium, one (1) ounce to the gallon of said solution, dissolved in a large excess of water, is to be dashed over and mixed with said solution, and largely-diluted sulphuric acid is to be instantaneously scattered over the precipitating mass until it becomes as white as is desired.

Sixth. Instead of using the mixture of hydrochloric and nitric acids, a weak alum solution may be employed, adding one-half ounce of glycerine. This treatment will be found preferable where that peculiar bluish-white is to be attained in imitations of porcelain and marble for statuary and like purposes, or when the product is likely to be much exposed to the action of water. To attain the desired color more satisfactorily, a few drops of aniline-blue dissolved in alcohol are to be added. The precipitated mass obtained under the previous methods may also be washed with a feeble solution of alum and glycerine. For very dark shades, instead of using the mixture of hydrochloric and nitric acids, a solution of tannin, one-half (½) pound to the said four hundred gallons is first to be intermixed with it, and then either of said acids may be added until precipitation ensues.

Seventh. The mass is then to be pressed. I cover an iron or wooden box with apertures of moderate size in its bottom and sides with muslin or other cloth, fill it with portions of the mass, scrape the surface with a straight-edge and cover with the ends of the cloth. I proceed in the filling of other boxes in this way, and as the bottom of each is beveled so that it is suited to cover the material in the box first filled, or the boxes are made of slightly-different sizes, and so that the bottom of one may serve as a cover for the material in another, the boxes when filled are placed one over another, and then under a heavy slab of iron, or of wood weighted, fitted into the uppermost box, and may overhang its edges about an inch. This nest of boxes is laid up inside of a frame-work made air-tight by the top cover fitted as a piston, and at the bottom of the frame-work an air-pump is adjusted. This is operated slowly, so as to remove not only the surplus moisture in the mass, but also air-cells which may have been left in it. These it is of the utmost importance entirely to remove, else a ferment spreads through, disintegrates, destroys the cohesion of the mass, and renders it for large articles entirely useless. If the mass contains terra-alba, and is heated from 140° to 150° Fahrenheit, it can be passed through rollers and made into sheets of any required thinness. These sheets may then be placed in a drying-room; but in most cases it is safer to separately place them in the boxes and treat as above. The cover may have an aperture in it, kept open or closed to regulate the pressure while the pump is being worked, the air allowed to enter the aperture to be cooled and deprived of moisture by being passed over chloride of calcium or other absorbent of moisture.

Eighth. The material in mass or sheets is then, after the cloths are taken off and cut as required into various sizes, removed to the drying-room. The air admitted to this room is first to pass over a series of bottles filled with sulphuric acid, quicklime, and chloride of calcium. If the arrangement of the drying-room does not allow the air to strike over the sulphuric acid, &c., I give the material or sheets a bath of phosphoric or sulphuric acid, wipe them off, and then place them in the drying-room. After remaining in it two or three days the material or sheets are then ready for final manufacture, either by turning, cutting, or pressing, except that where silica is incorporated it can be only ground or pressed.

Ninth. Before the last pressing to attain the manufactured product or parts thereof commences the material is to be softened. In cold and damp weather this is preferably to be accomplished by exposing it to hot air above 220° Fahrenheit, and in warm and dry weather by high steam. This hot air or high steam is let into an iron box in which the material, on shelves of perforated tin, has been placed. In about a half hour, according to the thickness of material, the supply of hot air or steam is cut off and the box opened, and one, with asbestus gloves or like coverings for the hands, takes out the material and puts it into molds for final pressure into the desired shape or pattern. In cold weather the molds may be suitably warmed. When removed from the molds and after trimming the edges left by the outer lines of the molds, the pieces so patterned are placed in the drying-room to remain, in winter time, at least two days.

Tenth. Thereafter the polishing process commences, first in the use of tallow or castor-oil for white, or of linseed or of cotton-seed oil for colored, products, and finishing with alcohol, or with shellac or copal dissolved in alcohol. For the darker shades a little color of the same tint may be added to the alcohol or its solutions. When a very fine and delicate polish is required, I put the shaped pieces in a bath of collodion thinned greatly with alcohol and ether, the latter in largest proportion, to which I add per gallon one-eighth of an ounce of castor-oil or glycerine, or one-half that quantity of each. Let the pieces dry for at least two hours, and rub with chamois, very fine felt, or material for like use.

Eleventh. When skimmed milk is not of easy access, the ordinary pot-cheese made without, or the skimmed-milk cheese with, rennet may be substituted and treated as above, except that the amount of caustic soda in the handling of the first is to be trebled and in that of the second quadrupled; or borax may be used in place of caustic soda. The amount of water for dissolving the cheese will be about four times its volume. Common salt is then to be added to this solution. It is not, however, to be cooled below 80° Fahrenheit before the fat can be skimmed or drawn off.

Twelfth. When a thin sheet of the more delicately-colored and costly material is designed for any structure, some of the less expensive incorporated with any of the above admixtures of silica with hydraulic cement, to give it solidity and strength, or pulp of any kind, where weight is objectionable, may be used as a backing to the thin sheet, and so applied before the final pressure in the mold or die.

Having fully described my invention, what I desire to claim and secure by Letters Patent is—

1. The combination of skim-milk with salt, caustic soda, terra-alba, hydrochloric, nitric, and sulphuric acids with coloring-matter, as above described and set forth.

2. The combination of skim-milk with caustic soda, alum, glycerine, ammonia, chloride of barium, and sulphuric acid with or without silica and coloring-matter, as above described and set forth.

3. The combination of pot-cheese with borax, hydrochloric, nitric, and sulphuric acids, silicate of sodium, terra-alba, and coloring-matter, as above described and set forth.

4. The combination of skim-milk cheese with caustic soda, alum, terra-alba, tannin, and silica, as above described and set forth.

LINBOMIR R. MESTANIZ.

Witnesses:
MILES F. POWERS,
ANDREW VAN KEUREN.